SUBSTATION CONNECTING ARRANGEMENT

Filed Aug. 10, 1959

INVENTOR.
EDWARD E. BAUMAN
BY Brown, Jackson, Boettcher & Dienner

United States Patent Office 3,076,871

Patented Feb. 5, 1963

3,076,871

SUBSTATION CONNECTING ARRANGEMENT

Edward E. Bauman, Galion, Ohio, assignor to North Electric Company, Galion, Ohio, a corporation of Ohio Filed Aug. 10, 1959, Ser. No. 832,730
10 Claims. (Cl. 179—2.5)

Figure 1:
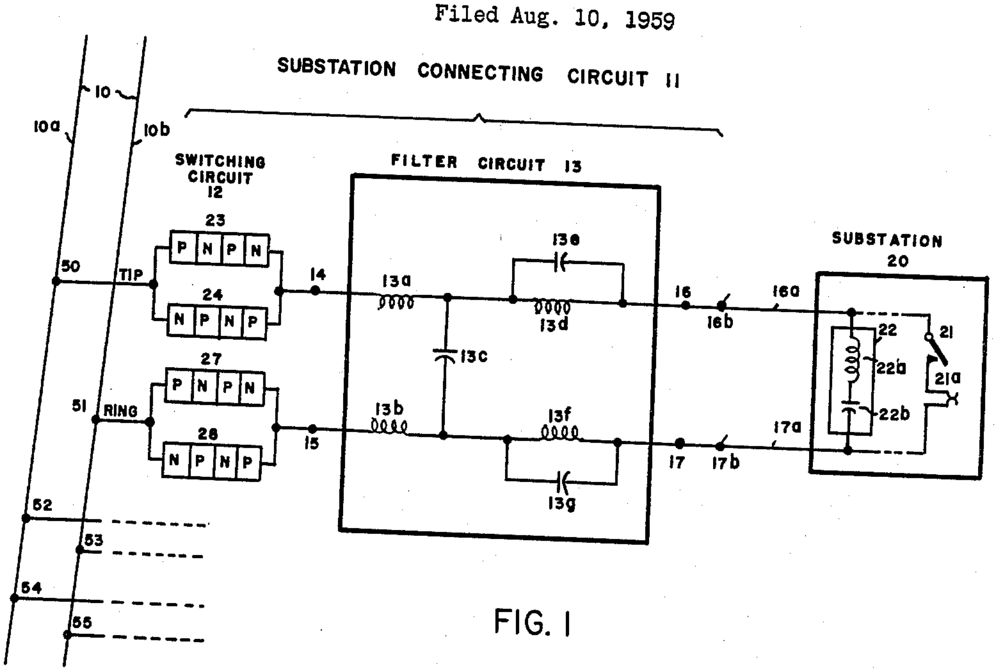

This invention relates to telephone systems for serving physical and carrier telephone subscribers, and more specifically to arrangements for connecting telephone substations to the lines of a telephone system which serve carrier subscribers.

In the communications field, a changing demand for service is frequently experienced in various areas, and the addition of further communication paths in many of these areas presents serious economic problems. Thus in certain areas, such as mining and resort areas, the demand may be of a temporary and limited nature, and the return from such installation frequently does not warrant the expenditure of the funds required to install additional transmission lines. In other areas, such as rural areas, the need for additional equipment is more permanent but the long distances between subscribers and the slow rate of growth of the area frequently result in an extremely expensive installation. In many instances, therefore, it is more advantageous and economical to provide an increased number of paths by adding electrical signalling channels to existing physical transmission paths rather than to install additional physical pairs of line conductors to serve the new subscribers.

In such type arrangements, the additional channels are created by transmitting a plurality of different carrier frequencies over the existing path, each of the different frequencies (*f*1, *f*2, *f*3, etc.), establishing a separate path or channel, and transmitting signal intelligence over these carrier channels by modulating the carrier frequencies with audio frequency intelligence. Thus a single pair of existing conductors may be used to transmit audio frequency signals for the existing substations in the normal manner, and may also be used to serve a number of additional carrier subscriber substations over the newly added carrier paths.

In certain types of installation, such as rural and mountain areas where the installation of many physical or metallic lines may be prohibitive from a cost standpoint, the first section of a physical line, in addition to serving regular "metallic" substations, may have a carrier termination which serves a group of carrier subscribers, and a high pass filter may be connected at such carrier termination to permit preselected carrier frequencies to pass to an extended section of the two-wire physical line (which is not metallically connected to the first section), for the purpose of serving more distant carrier subscribers. These and other forms of carrier installations which are known in the art are more fully shown and described in the copending application which was filed by Bauman et al. on May 13, 1955, and received Serial No. 508,118 and was assigned to the assignee of this invention, which issued as U.S. Patent No. 2,875,366, and reference is made thereto for such disclosure.

It is apparent that in such arrangements the two-conductor transmission lines may be used to transmit carrier current, modulated carrier current, voice current, ringing current, direct current and direct current pulses. It is necessary, therefore, to provide associated equipment between the line and substations which is operative only in response to the particular currents which are assigned for operation therewith. To such end, the carrier substations are coupled to the metallic line through appropriate termination and demodulator arrangements which pass only carrier demodulated audio frequency to the carrier substations.

The physical substations which are connected to the transmission line to respond to the audio frequenecy signals appearing thereon do not, of course, require a terminating and demodulating arrangement of the type used for the carrier substations. However, the physical substations (as well as the carrier substations which are connected to lines having carrier frequencies thereon), do require the connection of expensive and extended filter systems between the transmission line and the substation set to prevent the modulated carrier frequency energy from reaching such substation, while yet permitting the passage of voice signals and ringing signals thereto. Such filter system must be adapted to (*a*) prevent the telephone substation circuitry from shunting the carrier signals, (*b*) prevent the telephone from modulating the carrier and producing cross-talk, and (*c*) prevent the carrier messages in the audio range from being reproduced in the telephone receivers.

In conventional low pass filter systems now used in the field, optimum transmission along a line is normally accomplished when each filter system is terminated by telephone substations having an effective 600–900 ohm resistance in the off-hook condition. However, in the known systems when a substation is in the "on-hook" condition (i.e., the handset in the restored position), the filter system is "non-terminated" by such resistance, and the filter system will therefore exhibit a very low impedance which approaches a short circuit at a particular frequency. Such condition is particularly disturbing when the frequency at which the phenomenon occurs falls within the audio range, since the quality of the message transmission at such frequencies is adversely affected. Furthermore, it is readily apparent that when an appreciable number of filter systems of such type are connected to a line, the transmission characteristic of the line relative to voice frequencies is materially reduced.

As a result, there is a definite need in the field for an improved filter arrangement adapted for use in the connection of substations to carrier lines, and particularly to an arrangement of such type which will prevent the occurrence of the short-circuiting of the messages at a particular frequency, which will prevent loading of the line by the low pass filter when the filter is non-terminated (i.e., the substation in the "on-hook" condition), which will provide a direct connection of the bridging filter to the telephone line when the filter is terminated (in the "off-hook" condition), and which will pass ringing current to the telephone substation.

It is a particular object of the present invention to provide a substation connector means for connecting substations to carrier lines which is operative in such manner.

It is a specific object of the invention to provide a new and novel substation connector means for use in carrier systems which includes a semiconductor switching means and filter device connected between a substation and the transmission line, and particularly a switching device which may be switched from a high impedance state to a low impedance state responsive to the connection of a direct current path over the substation, and alternatively responsive to the application of ringing current voltages on the transmission line to extend the signals on the line to the associated filter device.

It is a further object of the invention to provide a novel substation connection means of such characteristics which comprise two pairs of four-layer diodes connected between the carrier transmission line and the filter system for the substation, each of which diodes comprise a two terminal P-N-P-N switch, each pair of which is connected in oppositely poled and parallel relation with each other, the different pairs being connected between a different side of the transmission line and the associated filter device.

Yet another object of the invention is to provide a novel substation connection means utilizing semiconductor switching devices which can be switched from a high-impedance state to a low-impedance state responsive to the selective completion of a direct current path at the substation by the subscriber, such switching devices being coupled between the transmission line and the substation to normally prevent the passage of audio current from the transmission line to the substation set.

A further object of the invention is the provision of a novel switching arrangement which is operative to provide selective connection of the substation to the transmission line in such manner, such switching arrangement being coupled between the terminal pair of a telephone substation and a two conductor transmission line, and comprising a first pair of multilayer semiconductor switching devices parallel-coupled between one substation terminal and one of the line conductors, and another pair of parallel-coupled multilayer semiconductor switching devices coupled between the other substation terminal and the other line conductor, whereby substantially the complete cycle of alternate polarity ringing signals are transmitted over the substation circuit, while yet permitting operation of the switching devices by the subscriber and the substation.

Figure 2:
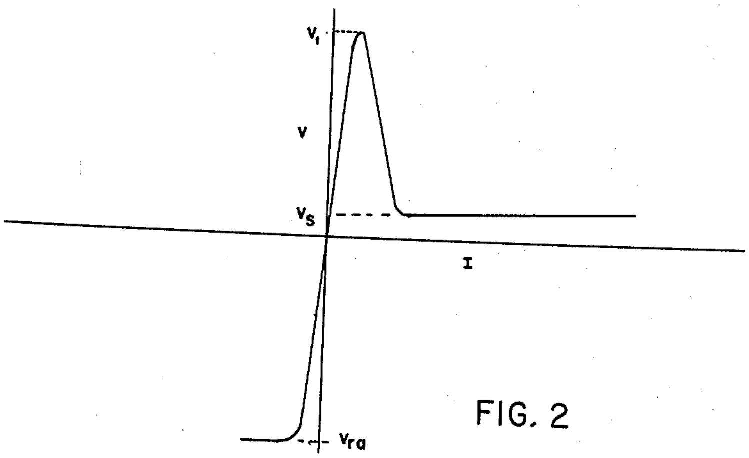

These and other advantages and features of the invention will become apparent with reference to the following specification, claims and drawings in which:

FIGURE 1 sets forth the connection of the novel substation connection arrangement, and the manner of connection af a plurality of groups of substations to a carrier line; and FIGURE 2 sets forth in graph form the operation of the switching device of the substation connection arrangement.

*Circuit Description*

As noted above, in certain commercial installations a two conductor transmission line may be used to transmit a plurality of different currents including carrier frequency currents, modulated carrier frequency currents, voice frequency currents, ringing frequency currents, direct current and direct current pulses. With reference to FIGURE 1, there is shown thereat a two-conductor transmission line 10 which includes tip conductor 10*a* and ring conductor 10*b* adapted to transmit carrier frequency currents, which may be in the order of 9.25–110 kc., 4.4 volts; modulated carrier frequency currents, which may be in the order of 6.25–113 kc., 4.4 volts; voice frequency currents, which may be in the order of 200–3000 cycles, .7 volt; ringing frequency currents, which may be in the order of 16⅔–66⅔ cycles, 85–160 volts; and direct current and direct current pulses, which may be in the order of 50 volts. The identified current values, which are those used in one conventional system in the field, have been set forth hereat for exemplary purposes and are not to be considered as limiting of the scope of the generic term of the invention. The term "Audio frequencies," used in the present description as a generic term, is considered to be, and is defined in the art as a frequency corresponding to an audible sound wave having limits of about 20 cycles to 15,000 cycles per second.

The transmission line 10 in the illustrated system in FIGURE 1 is adapted to serve a plurality of groups of subscriber substations, such as the subscriber substation group which is connected to the line at connecting points 50 and 51 and includes the illustrated subscriber substation 20. Other groups of subscriber substations may be connected to the line as indicated at connecting terminals 52, 53, 54, 55, etc. Each subscriber group, such as the group including subscriber substation 20, is connected to the transmission line 10 by a substation connection means 11, which includes a switching circuit 12, and a filter circuit 13. Multiple symbols 16*b*, 17*b* are indicative of other substations of the group including substation 20, which may be connected to the transmission line 10 by the substation connector circuit 11.

The switching circuit 12 of each substation connecting circuit 11 basically comprises a first pair of four-layer diodes 23, 24, which are oppositely poled and connected in parallel between line terminal 50 and a first filter terminal 14, and a second pair of four-layer diodes 27 and 28 which are connected in oppositely poled, parallel relation between line terminal 51 and a filter terminal 15. As shown in FIGURE 1, one diode of each pair (diodes 23, 27 in the drawing) is connected between the line terminal and filter terminal in the direction P-N-P-N, and the other diode of each pair (diodes 24, 28) is connected in the direction N-P-N-P. The four layer diodes 23, 24, 27, 28 may be of the type which are commercially available as a 4N2OD type which is manufactured by the Schockley Transistor Corporation, and which has a voltage breakdown or avalanche point of 20±4 volts. Other types of semiconductors having similar ratings and characteristics may also be used therein.

The filter circuit 13 may comprise a low pass filter which blocks carrier frequencies, and which passes direct current, voice frequencies, and ringing frequencies. In the illustrated arrangement, the filter circuit 13 comprises a first mesh connected to the input terminals 14, 15, including a series resonant circuit comprised of inductances 13*a* and 13*b* and condenser 13*c* connected thereacross which essentially determine the cut-off point of the filter. A second mesh comprises a first parallel resonant circuit including inductance 13*d*, capacitor 13*e* and a second parallel resonant circuit including inductance 13*f* and a capacitance 13*g* connected to the output terminals 16 and 17 of the filter circuit 13, the parallel resonant circuit being included in the filter for the purpose of providing a greater degree of filtering for the carrier frequency.

It will be apparent to parties skilled in the art that filter 13 may have many different conventional forms and the illustrated embodiment is not to be considered as limiting of the scope of the disclosure.

The group of substations, such as schematically illustrated substation 20, which are served by the substation connecting circuit 11 are each connected to the output terminals 16, 17 over tip and ring conductors 16*a*, 17*a*; 16*b*, 17*b*, etc., and may comprise, according to conventional practice, a ringer circuit 22 including a ringer coil 22*a* and series connected capacitor 22*b* which are normally bridged across the tip and ring conductors 16*a*, 17*a*; and a control circuit including normally open hook switch contacts 21 and a set of normally closed dial pulsing contacts 21*a* connected in parallel with the ringer circuit 22. Hook switch contacts 21, as described hereinafter in more detail, are controlled by the position of the subscriber handset on the substation.

It is apparent from the foregoing description that each substation of the group including substation 20 is normally connected to the transmission line 10 by a path which extends from tip conductor 10*a* of transmission line 10 over line terminal 50, the first pair of four-layer diodes 23, 24, terminal 14, filter circuit 13, terminal 16, and the various tip conductors 16*a*, 16*b*, etc., to the different substations, such as 20, over the ringer circuit 22 of the different substations, and the ring conductors 17*a*, 17*b* thereat to terminal 17, the filter circuit 13, terminal 15, and the second pair of four-layer diodes 27, 28 to line terminal 51 and the ring conductor 10*b* of transmission line 10.

Manifestly, when the substation is in the "on-hook" condition, and contacts 21 are open, the ringer circuit 20 is connected across the transmission line 10 and the high impedance of the ringer circuit is connected across the parallel resonant circuits of filter 13. At such time, the filter 13 is considered to be "non-terminated." As shown hereinafter, when the handset is removed from the substation instrument (off-hook condition) contacts 21 are closed, and the conventional 600–900 ohm terminating impedance of the substation is coupled across the two parallel resonant circuits of filter 17. At such time the filter 13 is "terminated" in that the impedance of 600–900 ohms is connected across the two parallel resonant circuits of the filter.

*Circuit Operation*

In that the operation of the novel circuit is inherently related to the operation characteristics of the four-layer diodes 23, 24, 27, 28 in the switching circuit 12, a brief description thereof is initially set forth hereat.

Briefly a four-layer diode is a switching element comprising a suitable dimensioned semiconductive silicon body having four zones arranged in succession, contiguous zones being of opposite conductivity type, and including electrical connections to only the two end zones, the two intermediate zones being allowed to float. Such a switching device is not only a two terminal device but is one in which only two electrical connections to the body in all are required.

It is characteristic of such type switch that the semiconductive silicon body included therein is designed so that the triggering action employed results in a change in the effective alpha of the body from a value which is less than unity to a value which becomes unity, where the effective alpha of the body is defined as the sum of the inherent alphas of the two intermediate zones and the inherent alpha of each intermediate zone is defined as the ratio of the current change across the collecting junction of the zone to the current change across the emitting junction of the zone, if the potential across the collecting junction were held constant. A body of the kind described exhibits between the terminal connections to its two end zones, a high impedance when its effective alpha is less than unity, and a low impedance when its effective alpha equals or exceeds unity.

For operation as a switch, there is applied between the two terminal connections to the body, a voltage whose polarity is such as to bias in reverse the rectifying junction which exists between the two intermediate zones. Under such conditions, before being triggered, the element exhibits, between its two terminals, the impedance of the reverse-biased rectifying junction, which generally is very high. The element is triggered to a low impedance state typically by temporarily increasing the voltage applied across its two terminals beyond a predetermined switching value, which results in a breakdown of the reverse-biased rectifying junction and a sharp decrease in the impedance which is viewed across the two terminals of the element. This low impedance state persists so long as the voltage applied is sufficient to insure the flow of a predetermined sustaining current through the body. In such low impedance state, the voltage needed to sustain current flow is appreciably less than that needed to initiate the switching action.

In FIGURE 2 there is plotted the voltage appearing across the diode element against the current flowing. Low current flows, corresponding to the high impedance state of the element, until the breakdown voltage $V_1$ is reached. There then follows an unstable negative resistance region in the voltage-current characteristic ($V_1$—$V_s$). Next, there follows a region in which, although the current flow is appreciable, only a small voltage appears across the element corresponding to the low impedance state of the element. In this region, the major portion of the voltage applied by the supply is developed across the circuitry associated with the element.

After breakdown has been initiated, the breakdown condition will be sustained if there is maintained across the element sufficient voltage in insure the flow of the sustaining current. If the voltage applied is lowered beyond this value $V_s$, the element returns to its high impedance state and remains in such state until the breakdown initiating voltage $V_1$ is again reached.

A more detailed discussion of the diodes may be found in the U.S. Patent 2,855,524, which issued to William Shockley on October 7, 1958, and in the September 1956 issue of the Proceedings of the IRE which contains an article (pages 1174–1182) entitled "P-N-P-N Transistor Switches."

Summarizing, the four-layer diodes 23, 24, 27, 28 are two terminal switching devices which present an extremely high impedance, in the order of megohms, until such time as their breakdown (or avalanche) point is reached, whereupon the devices go through a negative resistance region, and are maintained in the switched condition, presenting only one or several ohms resistance, as long as sufficient voltage, which may be quite low, is maintained thereacross to cause a predetermined minimum current to flow therethrough. Each switching device may be returned to its first high resistance condition by a voltage pulse of opposite polarity or by opening its circuit.

In the present arrangement, substation connecting circuit 11 including the switching circuit 12 with its four-layer diodes 23, 24, 27, 28 is connected to normally present a high impedance to the passage of carrier and audio-frequency currents on line 10 to the group of substations including substation 20; to couple the ringing currents which are transmitted over the transmission line 10 to the group of subscribers, including substation 20, for signalling purposes; to permit the passage of currents on the line in the direction of substations, such as 20, whenever the handset of a substation instrument, such as 20, is in the "off-hook" condition; the filter circuit 13 blocking the carrier frequency currents from the group of substations including substation 20. The manner in which the substation connecting circuit 11 effects the different selective controls for the different conditions is now set forth in detail.

*On-Hook Quiescent Condition*

With the handset of the substation 20 in the restored condition, and the absence of ringing current on line 10, the substation is in the "On-Hook" quiescent condition. During such period, metallic talking currents (.7 volt at 200–3000 cycles) and direct current battery of 48 volts occasioned by a physical substation in the talking or listening condition, may be on line 10; carrier current (4.4 volts at 9.25–110 k.c.) may be on the line due to a carrier substation being in the off-hook condition dialing or waiting for answer; and carrier modulated by voice currents (4.4 volts 6.25–113 k.c.) due to a carrier subscriber substation being in the talking condition may be on the line. With the existence of such condition it is the function of the subscriber connecting circuit 11 to block such currents from the substations of its associated group including substation 20.

As shown in FIGURE 1, one circuit extends from the tip conductor 10*a* of line 10 over terminals 50 to the parallel arrangement of four-layer diodes 23 and 24, the components of filter 13 including coil 13*a*, condenser 13*c*, and coil 13*b*, and the parallel arrangement of four-layer diodes 27 and 28 to the ring conductor 10*b*. A second circuit extends over the parallel resonant circuits of filter 13 to the ringer circuit 22 of the substations, such as 20, with a path through condensers such as 22*b*.

However, since the above noted frequencies which may be on the line 10 at this time have voltages which are of too low a value to cause the four-layer diodes to advance through the avalanche point, the semiconductors 23, 24, 27, 28 are maintained in their extremely high impedance state, and effectively block the currents on the line from the filter 13 and the group of substations including substation 20.

*Off-Hook Condition*

It is noted that if substation 20 is a physical substation, the positive pole of 50 volt switchboard battery will be connected to tip conductor 10*a* and the negative pole thereof to ring conductor 10*b*; and if substation 20 is a carrier substation, the positive pole of the 50 volt carrier pole-mounted unit will be connected to the tip conductor 10a and the negative pole thereof to ring conductor 10b. In either event, the terminals 50, 51 will "see" 50 volt direct current. However, since there is normally no direct current path linking the terminals 14, 15 of the diodes, the potential difference does not appear across the diodes 23, 24, 27, 28, and the diodes normally exhibit a high impedance state to the currents on the transmission line 10.

Assuming now that the subscriber at substation 20 initiates a call (or answers a call) by removing the handset from the substation instrument, contacts 21 are closed in the conventional manner, and a circuit is completed from the positive pole of the 50 volt battery over conductor 10a of transmission line 10, line terminal 50, the four-layer diode 23 in the direction P-N-P-N, terminal 14, coil 13a, 13d, terminal 16, tip conductor 16a, the low resistance components in substation 20 (not shown), closed contacts 21, closed dial contacts 21a, ring conductor 17a, terminal 17, coils 13f, 13b, terminal 15, four-layer diode 28 in the direction P-N-P-N, and line terminal 51 to the ring side of line 10, and the negative pole of the 50 volt battery. The effective resistance of the substation 20 to direct current in such circuit is approximately 75 ohms, and since such value, with a normal loop resistance, is negligible relative to the megohm resistance of the four-layer diodes 23 and 28, the 50 volt battery potential divides approximately evenly across the two diodes. Assuming that the diodes have an avalanche point of not over 20 volts, the potential across each of the diodes 23 and 28 rapidly rises toward 25 volts.

Referring to FIGURE 2, when the potential reaches 20 volts (point V1), diodes 23 and 28 rapidly go through their negative resistance region in which the voltage across the diodes decreases to point $V_s$, which may be in the order of a few volts. At this point, current flows across the diodes almost as though points 14 and 50 were connected by a metallic conductor, and the alternate four-layer diodes 24 and 27 of the respective pairs which are oppositely poled probably will present a high resistance thereto. That is, diodes 23 and 27 in passing through their avalanche region, tend to prevent diodes 24 and 28 from going through their avalanche region. If, however, for some reason, such as a variation in diode characteristics, diode 24 (and/or 27) should go through their avalanche regions, the reduced resistance (which is still much higher than 23 and 28) would aid in providing another parallel branch over which current could flow. The low resistance of diodes 23 and 28 prevents modulation by these diodes, and if diodes 24 and 27 pass through their avalanche point to a point of lesser resistance, any modulation by diodes 24 and 27 would be effectively shunted by companion diodes 23 and 28.

With diodes 23 and 28 switched to their low resistance condition, a low resistance path is provided for the transmission of direct current, voice current, and carrier current from the transmission line 10 to filter 13, which being a low pass filter passes direct current and voice frequencies to the substations, such as 20, and blocks the carrier frequencies therefrom. It should be understood that voice currents resulting from the modulation of battery voltage by voice potential will also pass over diodes 23 and 28.

If pulsing occurs at a substation, such as 20, for the purpose of establishing a call from substation 20 in the direction of a called subscriber, dial pulsing contacts 21a thereof will open and close in the conventional manner, and each time contacts 21a open, diodes 23 and 28 revert back to their initial high-resistance region; and each time contacts 21a close, diodes 23 and 28 go through their avalanche region to their low resistance state, whereby direct current pulses are readily transmitted over the substation connecting circuit.

*On-Hook Condition With Ringing*

With substation 20 in the "on-hook" condition, contacts 21 are open, and as ringing current from the switchboard (if the substation 20 is a physical substation, or from the pole-mounted subscriber carrier terminal if substation 20 is a carrier substation) appears on transmission line 10, the substation connecting circuit is operative to extend the signals to the subscriber at substation 20. As noted above, the voltage of the ringing signals may be in the order of 85–160 volts R.M.S. at the switchboard (or the carrier subscriber terminal), and although attenuated somewhat in accordance with the resistance of the line 10, the signal will be much higher than the breakdown (avalanche) point of the four-layer diodes.

More specifically, during one portion of each ringing cycle, conductor 10a is of positive polarity relative to conductor 10b, and the voltage rises to the value of the diode breakdown voltages, whereby diodes 23 and 28 operate rapidly through their avalanche region, and pass the remaining portion of the half cycle over the filter circuit 13 and the ringer 22 of the substation 20. The effective circuit for the ringing signal extends from conductor 10a, over terminal 50, diode 23, coil 13a, parallel-resonant circuit 13e, 13d, terminal 16, tip conductor 16a, to ringer winding 22a, condenser 22b, conductor 17a, terminal 17, parallel resonant circuit 13g, 13f, coil 13b, terminal 15, diode 28, and terminal 51 to conductor 10b. In actual practice, one of the two diodes 23 and 28 probably reaches its breakdown point before the other diode, and passes through its avalanche point to establish a high voltage across the other of the diode to accelerate the switching thereof.

The potentials of conductors 10a and 10b approach an equal value as the first half cycle of ringing current crosses the X-axis, and the current flow through diodes 23 and 28 decreases to permit the diodes to revert to their high-resistance state.

As the ringing current builds up in the reverse direction during the alternate portion of each ringing cycle, conductor 10b becomes positive with respect to conductor 10a, and as the breakdown voltages of diodes 27 and 24 is reached, the diodes go through their avalanche region and pass the remaining portion of the half cycle through the filter circuit 13 to the ringer 22 over a circuit which extends from conductor 10b, over terminal 51, diode 27, terminal 15, coil 13b, parallel resonant circuit 13f, 13g, terminal 17, ring conductor 17a, condenser 22b, ringer winding 22a, tip conductor 16a, terminal 16, parallel resonant circuit 13d, 13e, coil 13a, terminal 14, diode 24 and terminal 50 to line conductor 10a.

The potentials of conductors 10a and 10b equalize as the half cycle of ringing current crosses the X-axis, and as the current flow through diodes 27 and 24 decreases sufficiently, both of the diodes switch back to the high resistance region.

Ringing current for other substations reached over line 10 may also pass through ringer 22, but if ringer 22 is a frequency ringer, it will not respond thereto.

Thus by use of four-layer diodes (i.e., P-N-P-N switches), between the transmission line and the low pass filter, the desired filter action is achieved without loading the transmission line and without the inherent short circuit of the currents at a particular frequency, while yet permitting the normal intended functioning of the substation circuit.

While a particular embodiment of the invention has been shown and described, it is apparent that modifications and alterations may be made, and it is intended in the appended claims to cover all such modifications and alterations as may fall within the true spirit and scope of the invention.

What is claimed is:

1. In a telephone system in which a transmission line carries direct current, audio current, and carrier current, said system including a telephone substation having a circuit path therein and a filter connected between said transmission line and said substation (operative to suppress at least one of said currents and to pass the others of said currents), the improvement which comprises a plurality of semiconductor switching means, each of which is operative to switch from a high impedance state to a low impedance state responsive to the coupling of a direct current voltage of a predetermined polarity and predetermined value thereacross, means for connecting said semiconductor switching means between said filter and said transmission line to normally provide a high impedance to the flow of said currents thereover, and an energizing circuit including said filter and said circuit path in said substation for establishing a voltage of at least said predetermined value across at least certain of said semiconductor switching means to decrease the impedance of said certain semiconductor switching means, and thereby permit the passage of said currents thereover to said filter, said filter being operative to block said one current and to pass the others of said currents to said substation.

2. In a telephone system, including a circuit arrangement for connecting a telephone substation to a transmission line over which direct current, audio current, and carrier current are transmitted, said circuit arrangement including a plurality of semiconductor switching devices, each of which is operative to switch from a high impedance state to a low impedance state responsive to the coupling of a direct current voltage of a predetermined polarity and predetermined value thereacross, a low pass filter operative to block said carrier current and to pass the other ones of said currents having a direct current path thereover, means for coupling said low pass filter to said substation, means for coupling said semiconductor switching devices between said filter and said transmission line to normally provide a high impedance to the flow thereover of said currents on said line, and switch means in said substation for establishing a direct current path over said substation, said filter, and at least certain of said semiconductor switching devices to thereby establish a voltage of said predetermined polarity and at least said predetermined value across said certain semiconductor switching devices, and thereby effect the passage of said currents thereover to said filter which passes only said other currents to said substation.

3. In a telephone system including a circuit arrangement for connecting a telephone substation having a circuit path to a transmission line which carries direct current, audio current, ringing current, and carrier current, said circuit arrangement including a plurality of semiconductor switching means, a low pass filter connected to said substation operative to block said carrier current and to pass the others of said currents, means for coupling said semiconductor switching means between said filter and said transmission line to normally provide a high impedance to the flow of said currents thereover, and means including said circuit path in said substation operative responsive to the coupling of ringing current to said transmission line to intermittently switch said semiconductor switching means to a low impedance state to thereby effect the passage of said ringing current over said semiconductor switching means and said filter to said substation.

4. In a telephone system which includes a circuit arrangement for connecting a telephone substation to a two conductor transmission line which carries direct current, audio current and carrier current, one of the conductors being connected to the positive pole of a direct current source and the other of the conductors being connected to the negative pole of said source; said circuit arrangement including a low pass filter device operative to block said carrier current and to pass the others of said currents having a first and a second pair of terminals, a plurality of semiconductor switching means, each of which comprises a four-layer diode P-N-P-N having a P and an N terminal, means for coupling the P terminal of one of said semiconductor switching means to said one conductor of said transmission line and the N terminal of said one semiconductor switching means to one of the first pair of filter terminals, means for coupling the N terminal of a second one of said semiconductor switching means to said other conductor and the P terminal of said second semiconductor switching means to the other terminal of the first pair of filter terminals; means for coupling the second pair of filter terminals to said substation, and means in said substation for establishing a direct current path over said semiconductor switching means, said filter and said substation to establish a potential difference of a switching value across said semiconductor switching means, and thereby decrease the impedance of said semiconductor switching means to the currents on said transmission line for passage over said semiconductor switching means toward said filter device which passes only said other currents to said substation.

5. In a telephone system which includes a circuit arrangement for connecting a telephone substation to a two conductor transmission line over which signal currents including carrier currents are transmitted, said circuit arrangement including a filter device operative to suppress said carrier currents and to conduct the other ones of said signal currents having an input and an output set of terminals, a plurality of semiconductor switching means, each of which comprises a four-layer diode P-N-P-N operative to conduct said signal currents responsive to the establishment of a potential difference of predetermined level thereacross, means for coupling a first pair of said semiconductor switching means between one conductor of said transmission line and one of said filter input terminals in parallel, oppositely poled relation with each other, means for coupling a second pair of said semiconductor switching means between the other of said line conductors and a second input terminal of said filter in parallel, oppositely poled relation with each other, means for coupling the output terminal set of said filter to said substation, and control means for establishing a potential difference of at least said predetermined level across said semiconductor switching means.

6. In a telephone system which includes a circuit arrangement for connecting a telephone substation having a ringing current path extending thereacross to a two conductor transmission line which carries signal currents including ringing current and carrier current, said circuit arrangement including a filter device operative to suppress said carrier current and to conduct said ringing current having an input and an output set of terminals, a plurality of semiconductor switching means, each of which comprises a four-layer diode P-N-P-N, means for connecting a first and second one of said semiconductor switching means between one conductor of said transmission line and one of the filter input terminals in parallel, oppositely poled relation with each other; means for coupling a third and a fourth one of said semiconductor switching means between the other conductor of said line and a second input filter terminal in parallel, oppositely poled relation with each other; each of said switching means being operative to intermittently decrease its impedance responsive to the application of said ringing current to said transmission line to permit passage of at least a portion of each ringing signal over said semiconductor switching means and said filter; and means for connecting the output terminal set of said filter device to said ringing current path in said substation.

7. In a telephone system which includes a circuit arrangement for connecting a telephone substation to a two conductor transmission line which carries voice current, direct current, ringing current and carrier current, said circuit arrangement including a filter device operative to suppress said carrier current and to conduct the others of said currents having an input and an output set of terminals, a plurality of semiconductor switching means, each of which comprises a four-layer diode P-N-P-N, means for connecting a first pair of said semiconductor switching means between one conductor of said transmission line and one of the filter input terminals in parallel, oppositely poled relation with each other; means for coupling a second pair of said semiconductor switching means between the other conductor of said line and a second input filter terminal in parallel, oppositely poled relation with each other; each of said switching means being operative to decrease its impedance responsive to the application of ringing current to said transmission line to permit passage of at least a portion of the ringing current over said semiconductor switching means and said filter; means for connecting said filter to said substation, and means in said substation operative to complete a direct current path from said transmission line over said switching means, said filter and said substation to switch at least certain of said switching means to a low impedance state, and thereby effect the passage of the carrier current, voice current, and direct current over the switching means.

8. In a telephone system including a circuit arrangement for connecting a telephone substation having a pair of terminals to a two conductor transmission line which carries audio and direct currents, said circuit arrangement comprising connecting means for connecting at least a first semiconductor switching device between one substation terminal and one of said line conductors, including means for coupling at least a second semiconductor switching device between the other line conductor and the second substation terminal, each of said switching devices being operative to switch from a high impedance state to a low impedance state responsive to the coupling of a direct current voltage thereacross, and means in said telephone substation selectively operative to complete a direct current path which extends over said substation, and said semiconductor switching devices to said transmission line to effect said change of state of said switching devices and the passage of the audio currents thereover.

9. In a telephone system including a telephone substation having means for completing a path thereover, a pair of terminals, and a circuit arrangement for connecting said substation to a two conductor transmission line which carries voice currents and ringing signal voltages, said circuit arrangement comprising a first means for coupling a first and a second multilayer semiconductor switching device between one of said line conductors and one of said substation terminals in parallel, oppositely poled relation with each other, a second means for coupling a third and fourth multilayer semiconductor switching device between the other line conductor and the second substation terminal in parallel, oppositely poled relation with each other, each of said switching devices being operative to switch from a high impedance state to a low impedance state responsive to the coupling of a ringing signal voltage to said transmission conductors to thereby extend said ringing signals over at least one device in each of said first and second means and said path in said substation.

10. In a telephone system including a circuit arrangement for connecting a telephone substation having a pair of terminals to a two conductor transmission line which carries direct current, voice current, and ringing signal voltage, said circuit arrangement comprising connecting means for coupling a first and a second multilayer semiconductor switching device between one of said line conductors and one of said substation terminals in parallel, oppositely poled relation with each other including means for coupling a third and fourth multilayer semiconductor switching device between the other line conductor and the second substation terminal in parallel, oppositely poled relation with each other; each of said switching devices being alternately operative to switch from a high impedance state to a low impedance state responsive to the coupling of the different polarity portions of a ringing signal voltage of alternating polarity to said transmission conductors to thereby extend said ringing signals to said substation; and means in said substation operative to complete a direct current path over said switching devices, said connecting means, and said substation to switch at least certain of said switching devices to a low impedance state, and thereby effect the passage of the line currents thereover.

References Cited in the file of this patent

UNITED STATES PATENTS

| | | |
|---|---|---|
| 2,745,038 | Sziklai | May 8, 1956 |
| 2,857,464 | Singer | Oct. 21, 1958 |
| 2,924,667 | Hochgraf | Feb. 9, 1960 |
| 2,939,919 | Bonner et al. | June 7, 1960 |
| 2,951,124 | Hussey et al. | Aug. 30, 1960 |
| 2,953,692 | Eckert et al. | Sept. 20, 1960 |

OTHER REFERENCES

"P-N-P-N Transistor Switches," Proceedings of the IRE, September 1956 (pages 1174–1182 relied upon).